(12) United States Patent
Wang et al.

(10) Patent No.: US 12,152,593 B2
(45) Date of Patent: Nov. 26, 2024

(54) HIGH-SPEED CENTRIFUGAL COMPRESSOR

(71) Applicant: YANTAI DONGDE IND CO., LTD, Yantai (CN)

(72) Inventors: Shengke Wang, Yantai (CN); Ziyi Xing, Yantai (CN); Yuanhao Xie, Yantai (CN)

(73) Assignee: YANTAI DONGDE IND CO., LTD, Yantai (CN)

( * ) Notice: Subject to any disclaimer, the term of this patent is extended or adjusted under 35 U.S.C. 154(b) by 0 days.

(21) Appl. No.: 17/915,103

(22) PCT Filed: May 27, 2021

(86) PCT No.: PCT/CN2021/096361
§ 371 (c)(1),
(2) Date: Sep. 28, 2022

(87) PCT Pub. No.: WO2022/205599
PCT Pub. Date: Oct. 6, 2022

(65) Prior Publication Data
US 2024/0209861 A1    Jun. 27, 2024

(30) Foreign Application Priority Data

Apr. 2, 2021 (CN) .......................... 202110363253.5

(51) Int. Cl.
*F04D 17/10* (2006.01)
*F04D 29/051* (2006.01)
(Continued)

(52) U.S. Cl.
CPC .......... *F04D 17/10* (2013.01); *F04D 29/0513* (2013.01); *F04D 29/444* (2013.01); *F04D 29/582* (2013.01)

(58) Field of Classification Search
CPC .... F04D 17/10; F04D 29/0513; F04D 29/444; F04D 29/582; F04D 29/051;
(Continued)

(56) References Cited

U.S. PATENT DOCUMENTS 5,540,505 A * 7/1996 Struziak ................ F16C 17/042
384/105
6,024,495 A * 2/2000 Loos ....................... F16C 17/18
384/123

(Continued)

*Primary Examiner* — Courtney D Heinle
*Assistant Examiner* — Ryan C Clark
(74) *Attorney, Agent, or Firm* — Hemisphere Law, PLLC; Zhigang Ma

(57) ABSTRACT

A high-speed centrifugal compressor includes a shell, a stator, and a main shaft; a primary bearing pedestal and a secondary bearing pedestal which are used for supporting the main shaft are respectively mounted on inner sides of two ends of the shell; a thrust collar sleeves the main shaft between a primary diffuser and the primary bearing pedestal; one thrust air bearing is arranged on each of two sides of the thrust collar; a radial air bearing is arranged between each of the primary bearing pedestal and the secondary bearing pedestal and the main shaft; a sealing end cover is arranged between the primary worm wheel and the primary diffuser; several annular slots are arranged between the sealing end cover and the primary worm wheel; several annular slots are arranged between the secondary diffuser and the main shaft; and a backflow air cooling system is arranged in the shell.

8 Claims, 12 Drawing Sheets

(51) Int. Cl.
*F04D 29/44* (2006.01)
*F04D 29/58* (2006.01)

(58) Field of Classification Search
CPC .... F04D 29/041; F04D 29/043; F04D 29/053; F04D 29/057; F05D 2260/15; F05D 2260/20; F05D 2240/52; F05D 2240/53
See application file for complete search history.

(56) References Cited

U.S. PATENT DOCUMENTS

| | | | | |
|---|---|---|---|---|
| 6,702,463 | B1* | 3/2004 | Brockett | F16C 17/042 384/103 |
| 10,138,934 | B2* | 11/2018 | Omori | F16C 17/24 |
| 2005/0271311 | A1* | 12/2005 | Saville | F16C 17/042 384/106 |
| 2011/0255963 | A1* | 10/2011 | Kim | F04D 29/0513 415/211.2 |
| 2012/0207414 | A1* | 8/2012 | Kim | F16C 17/042 384/105 |
| 2015/0219147 | A1* | 8/2015 | Furuno | F16C 17/047 384/105 |
| 2015/0308456 | A1* | 10/2015 | Thompson | F04D 17/12 417/244 |
| 2016/0298648 | A1* | 10/2016 | Graham | F04D 29/0513 |
| 2016/0319859 | A1* | 11/2016 | Omori | F16C 27/08 |
| 2018/0087519 | A1* | 3/2018 | Bischof | F16C 33/14 |
| 2018/0283387 | A1 | 10/2018 | Fukuyama et al. | |
| 2020/0102964 | A1 | 4/2020 | Nakane et al. | |
| 2020/0259193 | A1* | 8/2020 | Sakota | F04D 25/06 |
| 2021/0340986 | A1 | 11/2021 | Ito et al. | |

\* cited by examiner

HIGH-SPEED CENTRIFUGAL COMPRESSOR

TECHNICAL FIELD

The present disclosure relates to a high-speed centrifugal compressor.

BACKGROUND

At present, the development of new energy fuel cell vehicles is considered to be an important part in the transformation of transportation energy and power. In order to ensure the normal operation of a fuel cell engine, the engine generally requires auxiliary systems such as a hydrogen supply subsystem, an air supply subsystem, and a circulating water cooling management subsystem. Lots of researches shows that the high-pressure, high-flow air supplying has an obvious effect on improving the power output of the existing fuel cell engine. Therefore, generally before air enters the engine, the intake air needs to be pressurized. A centrifugal air compressor is an energy conversion device to achieve this goal, and is one of the important components of the air supply system of the full cell engine.

The structure of a current high-speed centrifugal compressor mainly includes a shell, a stator and a main shaft. A primary bearing pedestal and a secondary bearing pedestal which are used for supporting a main shaft are respectively mounted on inner sides of two ends of the shell. A primary diffuser and a secondary diffuser are respectively mounted on outer sides of two ends of a motor shell. Two ends of the main shaft penetrate through the primary diffuser and the secondary diffuser and are respectively provided with a primary worm wheel and a secondary worm wheel. A primary volute and a secondary volute are mounted outside the primary worm wheel and the secondary worm wheel. During working, there are the following disadvantages;

I. The speed of the main shaft exceeds 10000 r/min. Due to its high speed, if a sealing ring is used for sealing between a high-pressure cavity and a low-pressure cavity, the sealing ring will be quickly worn and damaged, and cannot achieve a sealing effect. At present, there is no good technological means to solve the sealing problem between the high-pressure cavity and the low-pressure cavity in the industry.

II. A lot of heat will be generated inside during working. If the heat is not discharged in time is accumulated, the central compressor will be forced to stop due to an excessive internal temperature. At present, the centrifugal compressor is generally cooled by external water cooling and internal air cooling. In the internal air cooling form, internal components of the centrifugal compressor are required to have an air guide function. All the components can be fully cooled only if a reasonable conduction path for air flowing is formed internally. The existing internal air cooling structure has a single internal conduction path and is not reasonable in design, so that only some components, instead of all the functional components, can be cooled, and the cooling effect is poor. Therefore, it is necessary to redesign the internal air cooling structure.

III. A thrust air bearing is an important component in the centrifugal compressor. The air bearing generates an axial bearing force using a compression effect of a wedge-shaped air film between a top-layer foil and a thrust collar, and mainly includes a bottom plate, a middle supporting member, and the top-layer foil. It is of great importance to design the top-layer foil, which will directly affect the overall performance of the air bearing. The existing top-layer foils are mainly divided into two kinds of structures; a split structure and an integral structure. The advantages and disadvantages of the two kinds of structures in the prior art are now analyzed as follows; In the split structure, one side of each top-layer foil is fixed, and the other side is a free end. Its advantages are as follows; the free end of each top-layer foil has good floatability and can be fully formed into an air film. Once a certain top-layer foil deforms, it will not affect other top-layers foils. Its disadvantages are as follows; (1) An assembling process has extremely high requirements and is relatively complicated. There are strict requirements for both positioning and welding of each top-layer foil and a high requirement for machining accuracy. Slight warping will affect the planeness of the entire bearing. (2) The free end easily moves or warps axially to be in contact with the thrust collar. As a result, the free end of the top-layer foil and the thrust collar are worn, and the stability and the service life of the bearing are severely reduced. In the integral structure, the top-layer foils are connected into a whole. The advantages are as follows; It is convenient for positioning and assembling, and the free end will not move or warp axially, which avoids the contact wear between the free end of the top-layer foil and the thrust collar. The disadvantages are as follows; (1) The floatability of the free end of the top-layer foil is limited too much, which affects the rise or fall of the free end with a waveform, thus affecting the stability of the formed air film. (2) When the top-layer foil partially deforms, the entire top-layer foil will generate stress and even warp to deform, making the entire top-layer foil fail to use.

To sum up, the above-mentioned structural problems of a high-speed centrifugal compressor have become technical problems that need to be solved urgently in the industry.

SUMMARY

In order to overcome the shortcomings in the prior art, the present disclosure provides a high-speed centrifugal compressor, which solves the problem that due to its single conduction path, a conventional internal air cooling structure can only cool some components, instead of all the components, so that the cooling effect is poor, and solves the problem that air leaks from two stages of high-pressure cavities to a low-pressure cavity inside a centrifugal compressor, so that the compression efficiency is reduced.

In order to solve the above-mentioned technical problems, the technical solutions adopted in the present disclosure are as follows;

A high-speed centrifugal compressor includes a shell, a stator, and a main shaft; a primary bearing pedestal and a secondary bearing pedestal which are used for supporting the main shaft are respectively mounted on inner sides of two ends of the shell; a primary diffuser and a secondary diffuser are respectively mounted on outer sides of the two ends of the shell; two ends of the main shaft penetrate through the primary diffuser and the secondary diffuser and are respectively provided with a primary worm wheel and a secondary worm wheel; a primary volute and a secondary volute are mounted outside the primary worm wheel and the secondary worm wheel; the primary volute and the secondary volute are connected through a connection pipe; a thrust collar sleeves the main shaft between the primary diffuser and the primary bearing pedestal; one thrust air bearing is arranged on each of two sides of the thrust collar; a radial air bearing is arranged between each of the primary bearing pedestal and the secondary bearing pedestal and the main shaft; a sealing end cover is arranged between the primary worm wheel and the primary diffuser; several annular slots are arranged between the sealing end cover and the primary worm wheel; several annular slots are arranged between the secondary diffuser and the main shaft; and a backflow air cooling system is arranged in the shell.

The backflow air cooling system includes the following;

The primary diffuser includes a diffuser body; an air inlet hole communicated with an inner cavity of the primary volute is formed in the diffuser body; a worm wheel hole is formed in a center of the diffuser body; one side of the diffuser body is provided with a cooling air backflow cavity; a slot bottom of the cooling air backflow cavity is provided with several air guide slots; the air guide slots are communicated with the worm wheel hole; a first annular air guide slot is arranged on the diffuser body on the other side of a periphery of the cooling air backflow cavity; the cooling air backflow cavity is communicated with the first annular air guide slot through several air guide holes; the first air guide holes are communicated with the air guide slots; the other side of the diffuser body is provided with several first bosses corresponding to a thrust bearing; a first air guide channel is formed between adjacent first bosses; the first air guide channels are communicated with the worm wheel hole;

the primary bearing pedestal includes a bearing pedestal body; a main shaft hole is formed in a center of the bearing pedestal body; one side of the bearing pedestal body is provided with a thrust bearing mounting slot; a second annular air guide slot communicated with the air inlet hole is arranged on the bearing pedestal body at a periphery of the thrust bearing mounting slot; the thrust bearing mounting slot is communicated with the second annular air guide slot through several second air guide holes; a slot bottom of the thrust bearing mounting slot is provided with several second bosses corresponding to the thrust bearing; second air guide channels that are communicated are formed between adjacent second bosses; the second air guide channels are communicated with a main shaft hole; the bearing pedestal body between the thrust bearing mounting slot and the second annular air guide slot is provided with several via holes communicated with the first annular air guide slot;

air in the inner cavity of the primary volute enters the second annular air guide slot from the air inlet hole and enters the thrust bearing mounting slot via the second air guide holes; one part of the air in the thrust bearing mounting slot enters the main shaft hole via the second air guide channels and is discharged from the radial air bearing to a gap between the stator and the main shaft; and the other part of the air enters the worm wheel hole via the first air guide channels, flows back to the cooling air backflow cavity, then enters the first air guide holes via the air guide slots, enters the first annular air guide slot from the first air guide holes, is discharged from the first annular air guide slot to the gap between the stator and the main shaft through the via holes, enters a cavity between the secondary bearing pedestal and the secondary diffuser through the main shaft hole of the secondary bearing pedestal and the radial air bearing, is discharged to the outside, and is discharged out of the shell through small holes in the shell.

A bottom of the secondary diffuser is provided with an exhaust channel; a bottom of the shell is provided with an exhaust hole communicated with the exhaust channel; and the air between the secondary bearing pedestal and the secondary diffuser is discharged through the exhaust channel and the exhaust hole.

Several air guide vanes are circumferentially arranged on the diffuser body on the same side of the periphery of the cooling air backflow cavity.

Several air outlet holes are arranged between the first annular air guide slot and an outer end face of the diffuser body.

A radial air bearing mounting slot is arranged on the bearing pedestal body; and stopper slots used for mounting the radial air bearing are arranged on the bearing pedestal body on two sides of the radial air bearing mounting slot.

The several annular slots between the sealing end cover and the primary worm wheel are arranged on an inner surface of the sealing end cover or an outer surface of the primary worm wheel; and the several annular slots between the secondary diffuser and the main shaft are arranged on an inner surface of the secondary diffuser or an outer surface of the main shaft.

The thrust air bearing includes a bottom plate, a middle supporting member, and a top-layer foil; the top-layer foil includes several single foils; the several single foils are annularly arranged; and two adjacent single foils are flexibly connected to form an integral top-layer foil structure.

The two adjacent single foils are flexibly connected through a tie; the tie is wavy; and the tie and the two adjacent single foils are integrally formed.

The two adjacent single foils are connected through two ties; the two ties are respectively arranged at an annular inner edge and outer edge of the two adjacent single foils; notches are respectively formed in joints of the single foils and the ties; and the notches of the two adjacent single foils are abutted to form a space for accommodating the ties.

By the adoption of the above solution, the present disclosure has the following advantages;

The sealing end cover is added between the primary worm wheel and the primary diffuser. The several annular slots are arranged between the sealing end cover and the primary worm wheel. The several annular slots are arranged between the main shaft and the secondary diffuser. When the main shaft drives the primary worm wheel and the secondary worm wheel to rotate at a high speed, high-pressure cavities are formed in the primary volute and the secondary volute. The air leaks from the high-pressure cavities to the low-pressure cavity under the action of a pressure. When the air passes through the annular slots, air seals will be formed in the annular slots to prevent the air from continuing to leak to the low-pressure cavity subsequently. The several air seals formed in the several annular slots can greatly enhance a sealing effect between the high-pressure cavities and the low-pressure cavity and improve the compression efficiency of the high-pressure cavities.

By means of improving the structures of the primary diffuser and the primary bearing pedestal, the internal air cooling structure is better optimized, and can cool the two thrust air bearings, the two radial air bearings, the main shaft, and the stator in the high-speed centrifugal compressor, with a good cooling effect. The internal heat can be timely discharged, without being accumulated, so that the situation that the high-speed centrifugal compressor is forced to stop due to an extremely high internal temperature is avoided.

Two adjacent single foils in the thrust air bearing are flexibly connected to form the integral top-layer foil structure which has the advantages of the traditional split structure and integral structure. This structure is convenient to position and assemble. The machining accuracy of an elastic foil can be lowered, so that slight warping of the elastic foil will not affect the planeness of the entire bearing. The free end of the single foil will not move or warp axially, so that the wear caused by the contact with the thrust collar is avoided, and the service life is prolonged. The wavy tie ensures the integrality of the top-layer foil, and enables the top-layer foil to have a certain stretching quantity and deformation, without affecting the rise or fall of the free end of the single foil with the waveform, thus ensuring the stability of formation of the air film. Even if the top-layer foil partially deforms, the entire top-layer foil still works under the bending deformation caused by the stress.

Figure 1:
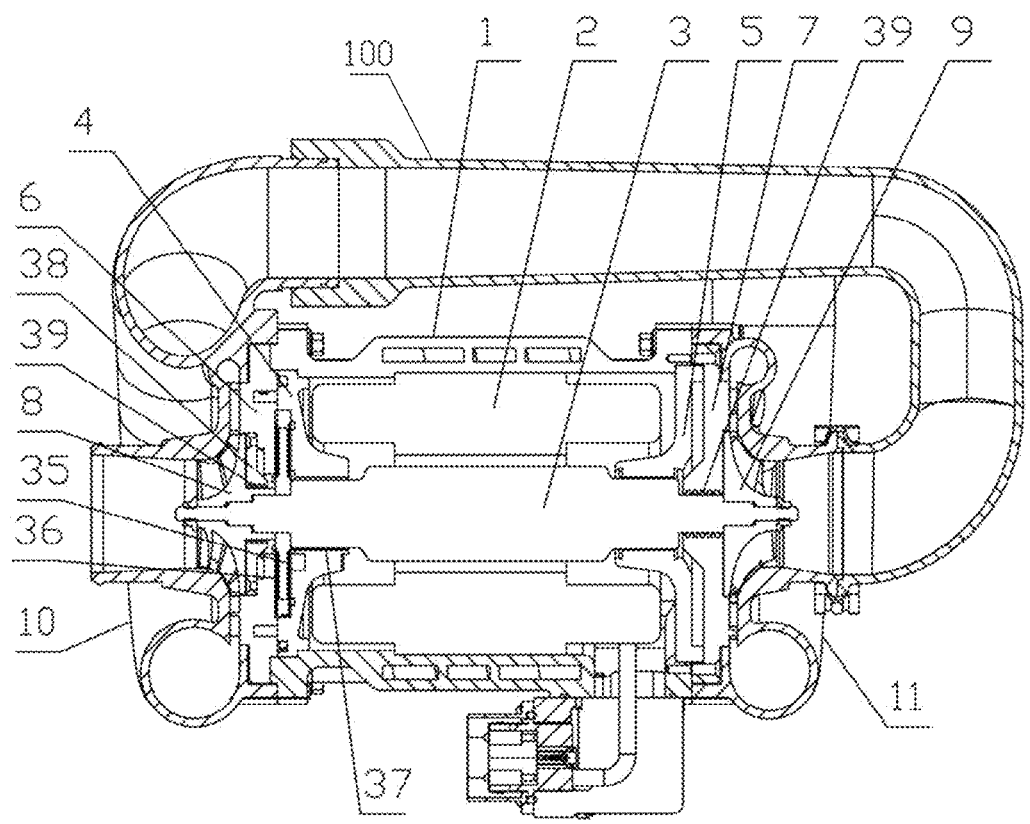
FIG. 1 is a schematic structural diagram of the present disclosure.

In the drawings; 1; shell; 2; stator; 3; main shaft; 4; primary bearing pedestal; 5; secondary bearing pedestal; 6; primary diffuser; 7; secondary diffuser; 8; primary worm wheel; 9; secondary worm wheel; 10; primary volute; 11; secondary volute; 12; diffuser body; 13; air inlet hole; 14; worm wheel hole; 15; cooling air backflow cavity; 16; air guide slot; 17; first annular air guide slot; 18; first air guide hole; 19; first boss; 20; first air guide channel; 21; bearing pedestal body; 22; main shaft hole; 23; thrust bearing mounting slot; 24; second annular air guide slot; 25; second air guide hole; 26; second boss; 27; second air guide channel; 28; via hole; 29; exhaust channel; 30; exhaust hole; 31; air guide vane; 32; air outlet hole; 33; radial air bearing mounting slot; 34; stopper slot; 35; thrust collar; 36; thrust air bearing; 37; radial air bearing; 38; sealing end cover; 39; annular slot; 40; bottom plate; 41; top-layer foil; 42; single foil; 43; tie; 44; notch; 45; cooling groove; 46; fixed mounting hole; 47; supporting foil; and 48; elastic foil.

DETAILED DESCRIPTION OF THE EMBODIMENTS

In order to clearly describe the technical features of this solution, the present disclosure will be described in detail below by specific implementations and accompanying drawings thereof.

Figure 2:
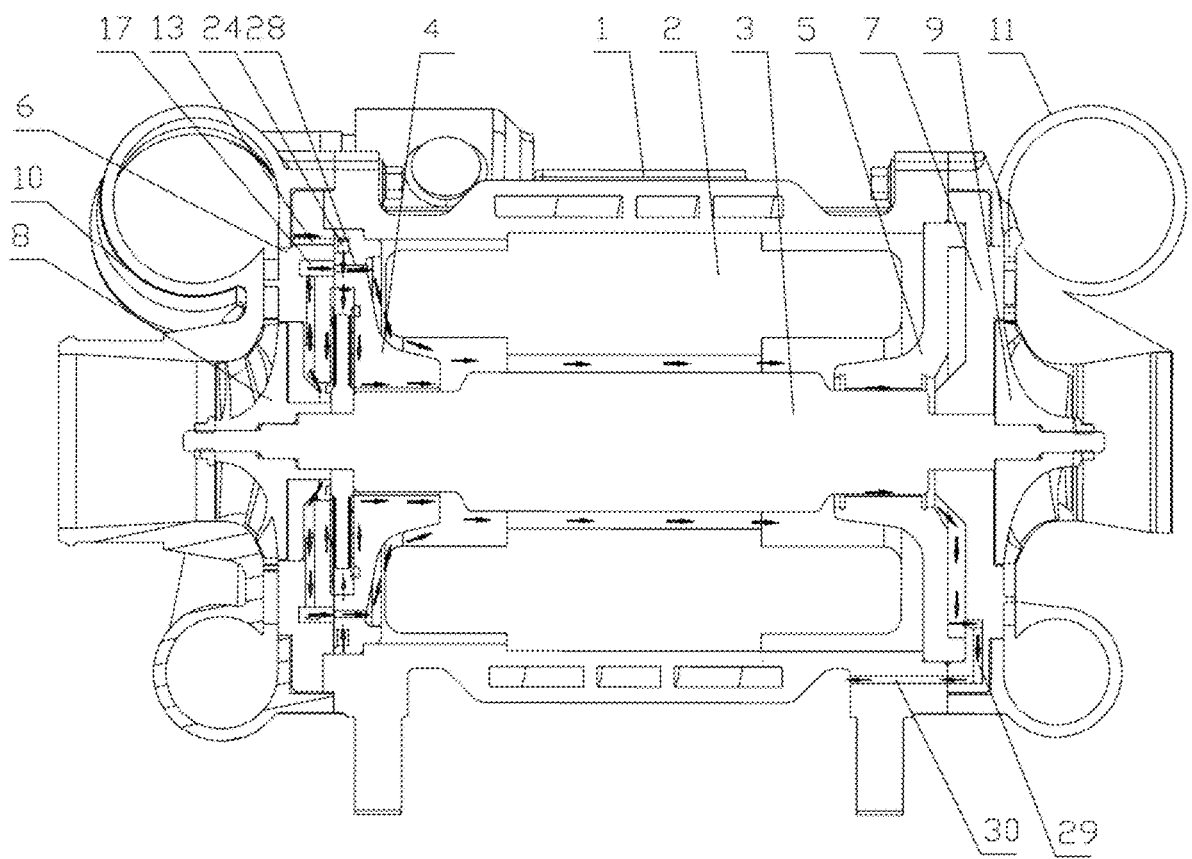
FIG. 2 is a schematic structural diagram of an internal air cooling line and principle of the present disclosure.
Figure 3:
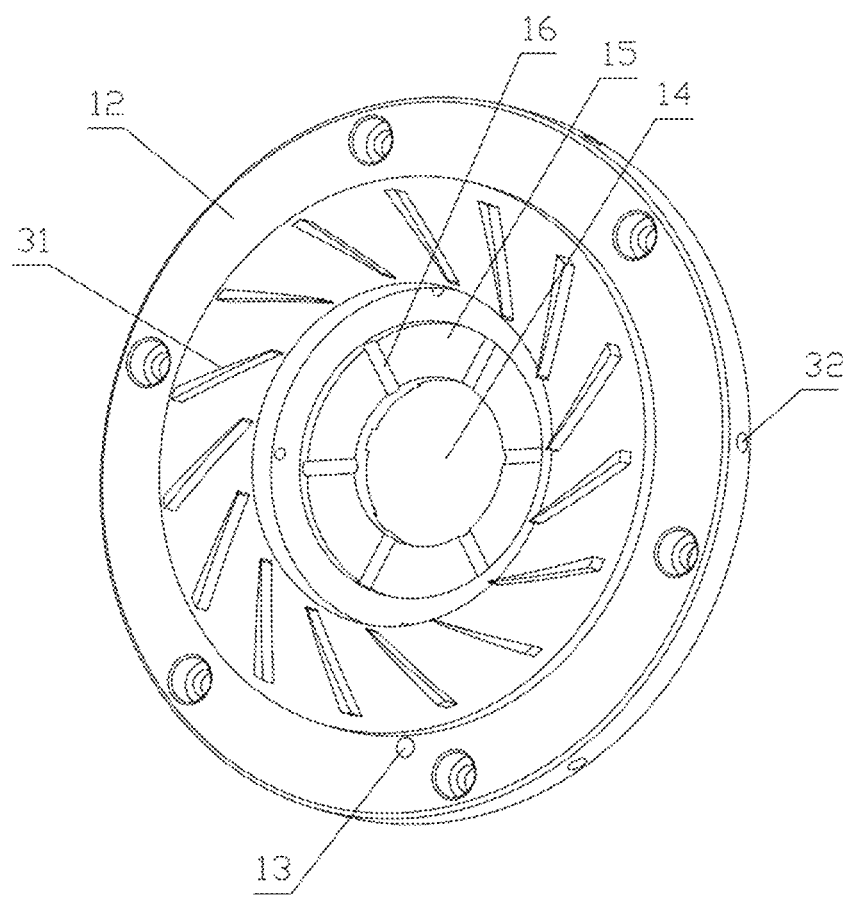
FIG. 3 is a three-dimensional schematic structural diagram of a front view of a primary diffuser of the present disclosure.
Figure 4:
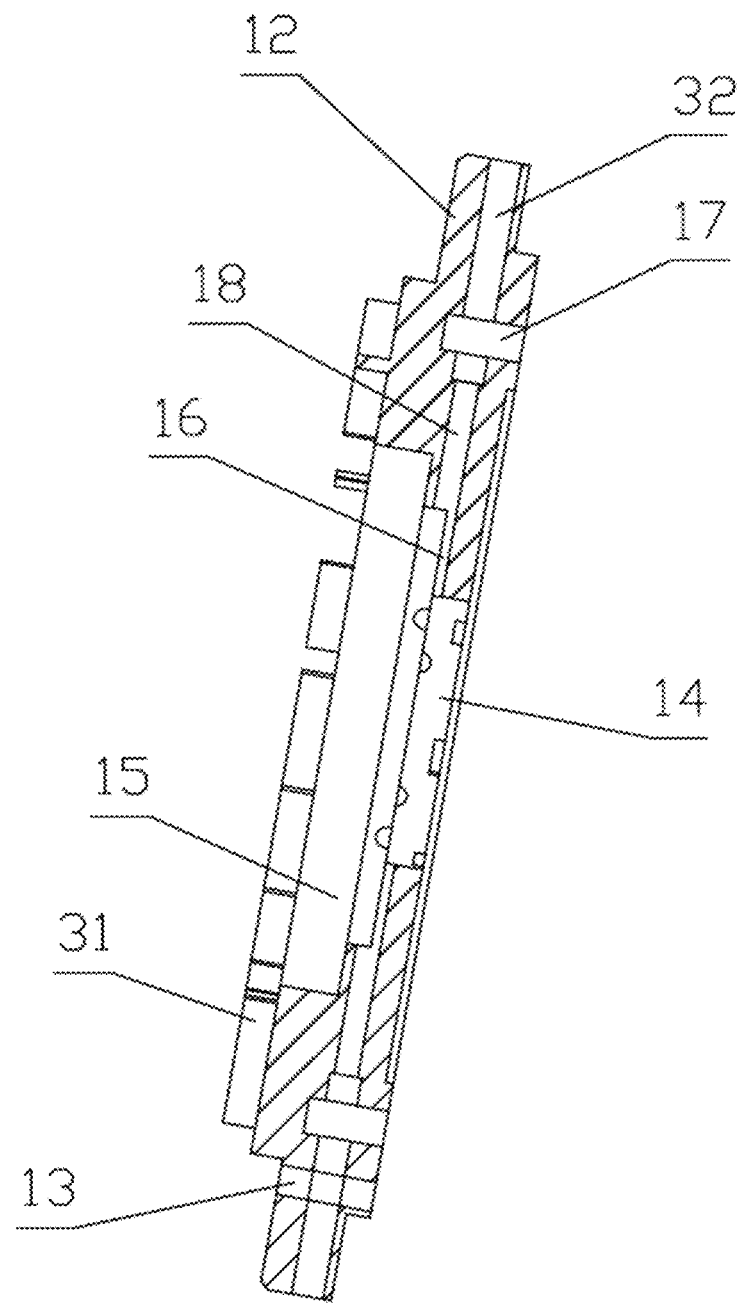
FIG. 4 is a schematic structural diagram of a sectional view of a primary diffuser of the present disclosure.
Figure 5:
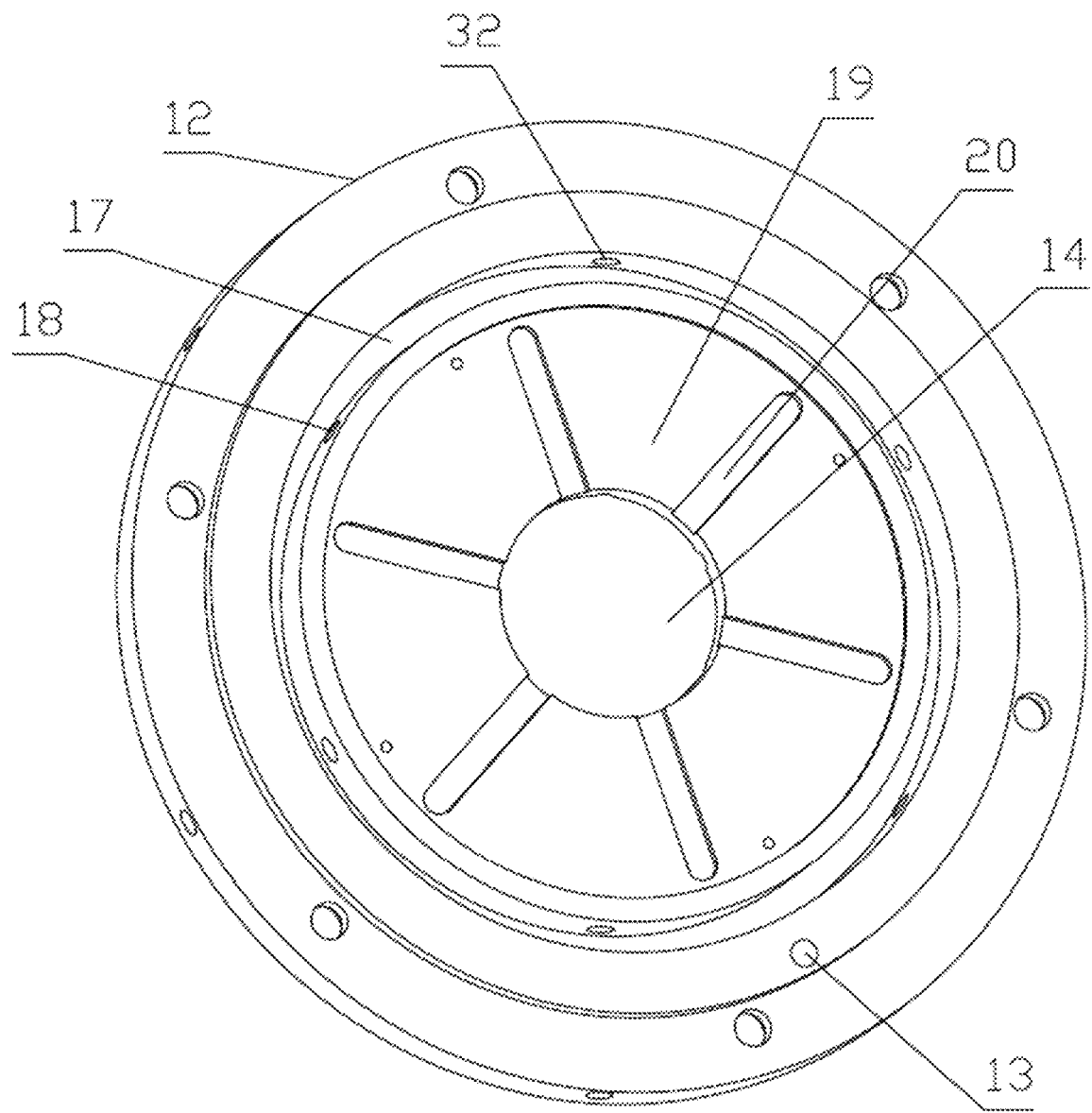
FIG. 5 is a three-dimensional schematic structural diagram of a rear view of a primary diffuser of the present disclosure.
Figure 6:
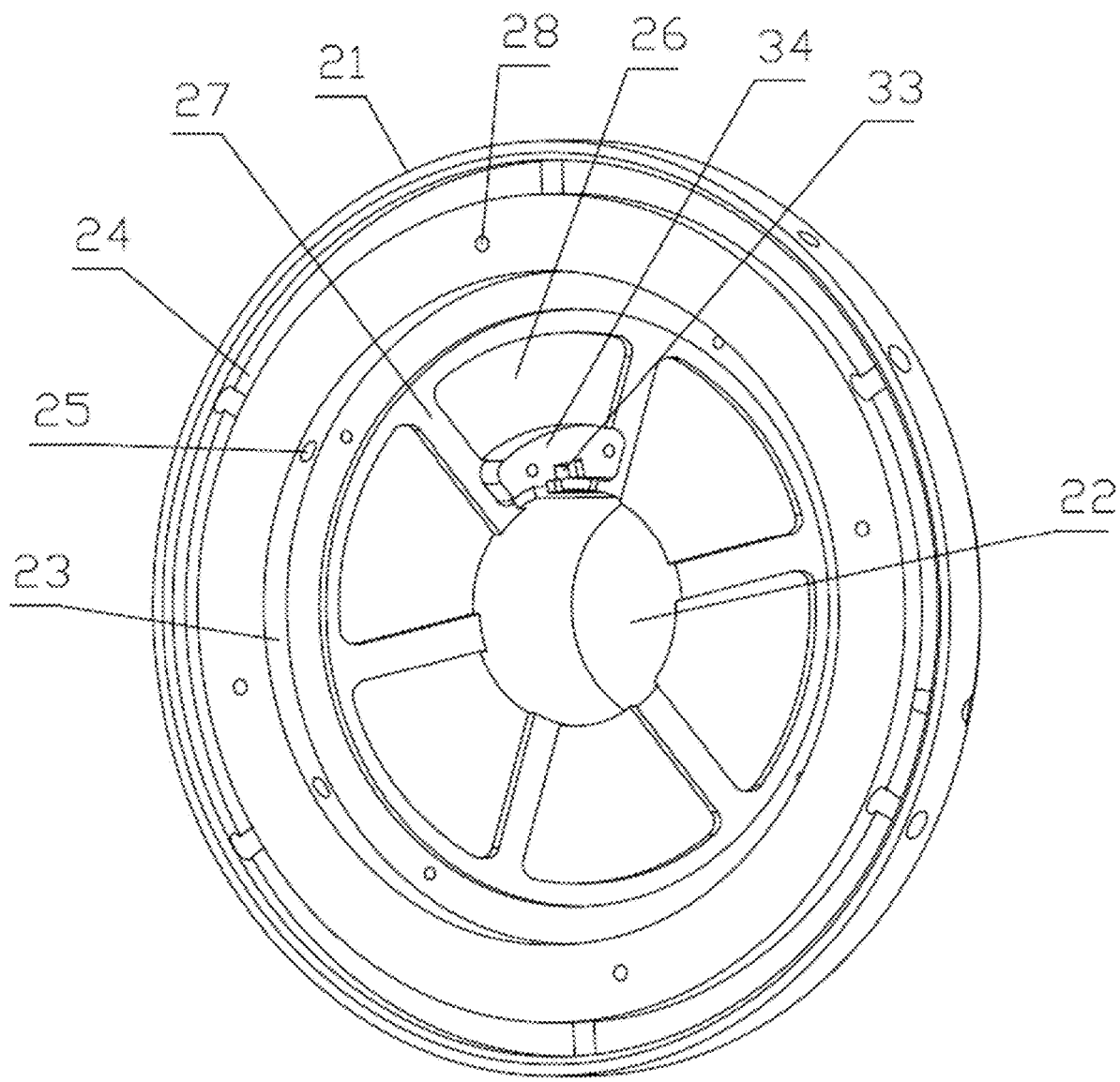
FIG. 6 is a three-dimensional schematic structural diagram of a front view of a primary bearing pedestal of the present disclosure.
Figure 7:
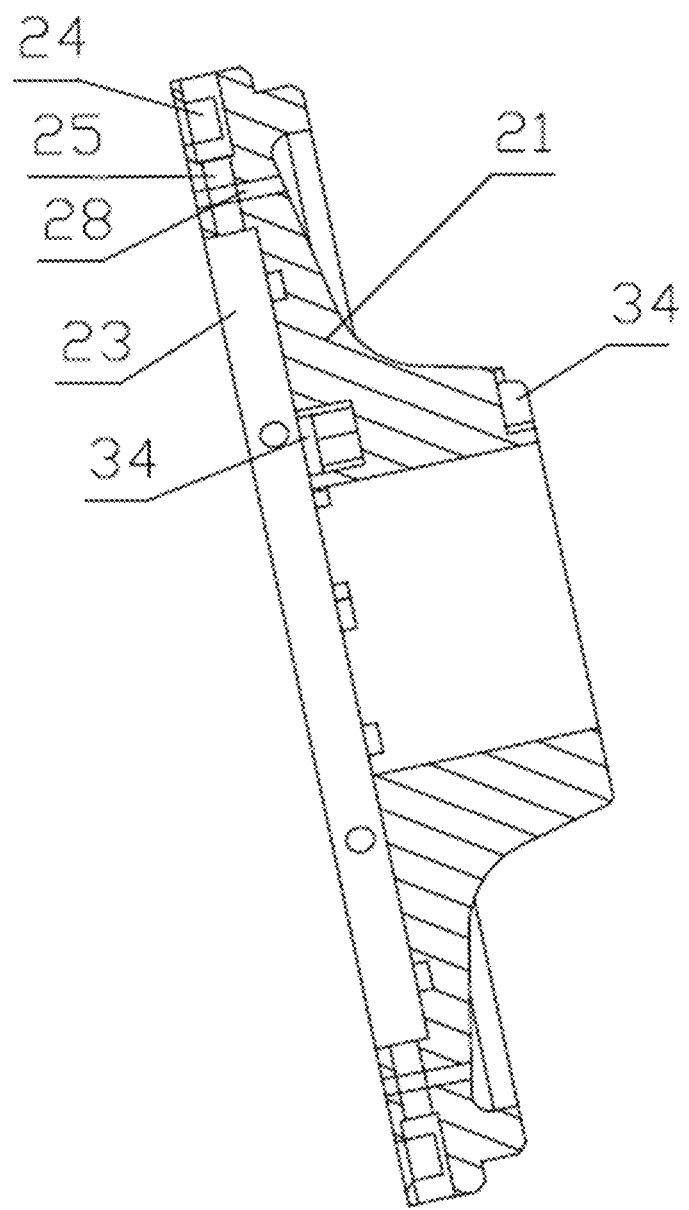
FIG. 7 is a schematic structural diagram of a sectional view of a primary bearing pedestal of the present disclosure.
Figure 8:
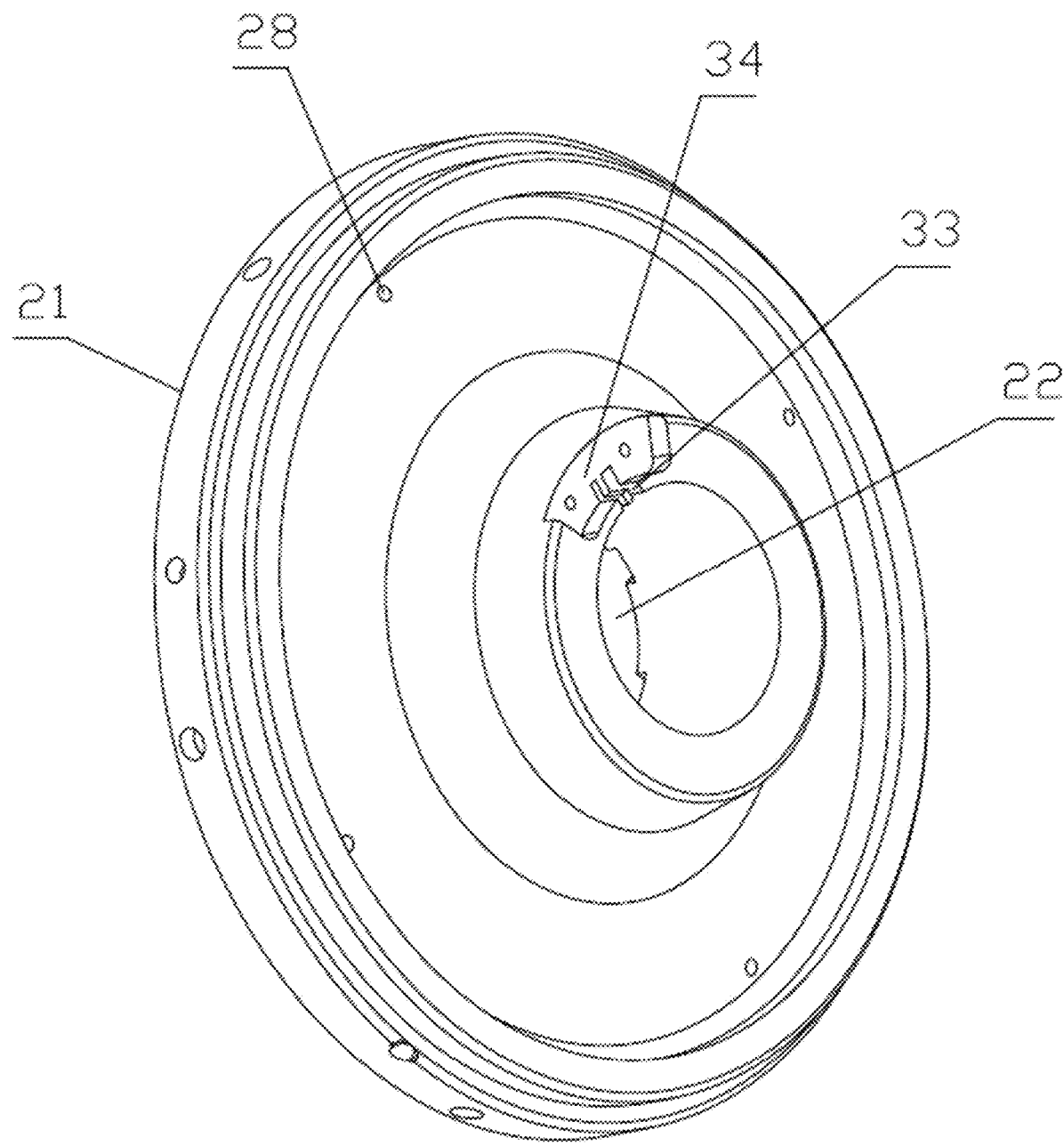
FIG. 8 is a three-dimensional schematic structural diagram of a rear view of a primary bearing pedestal of the present disclosure.
Figure 9:
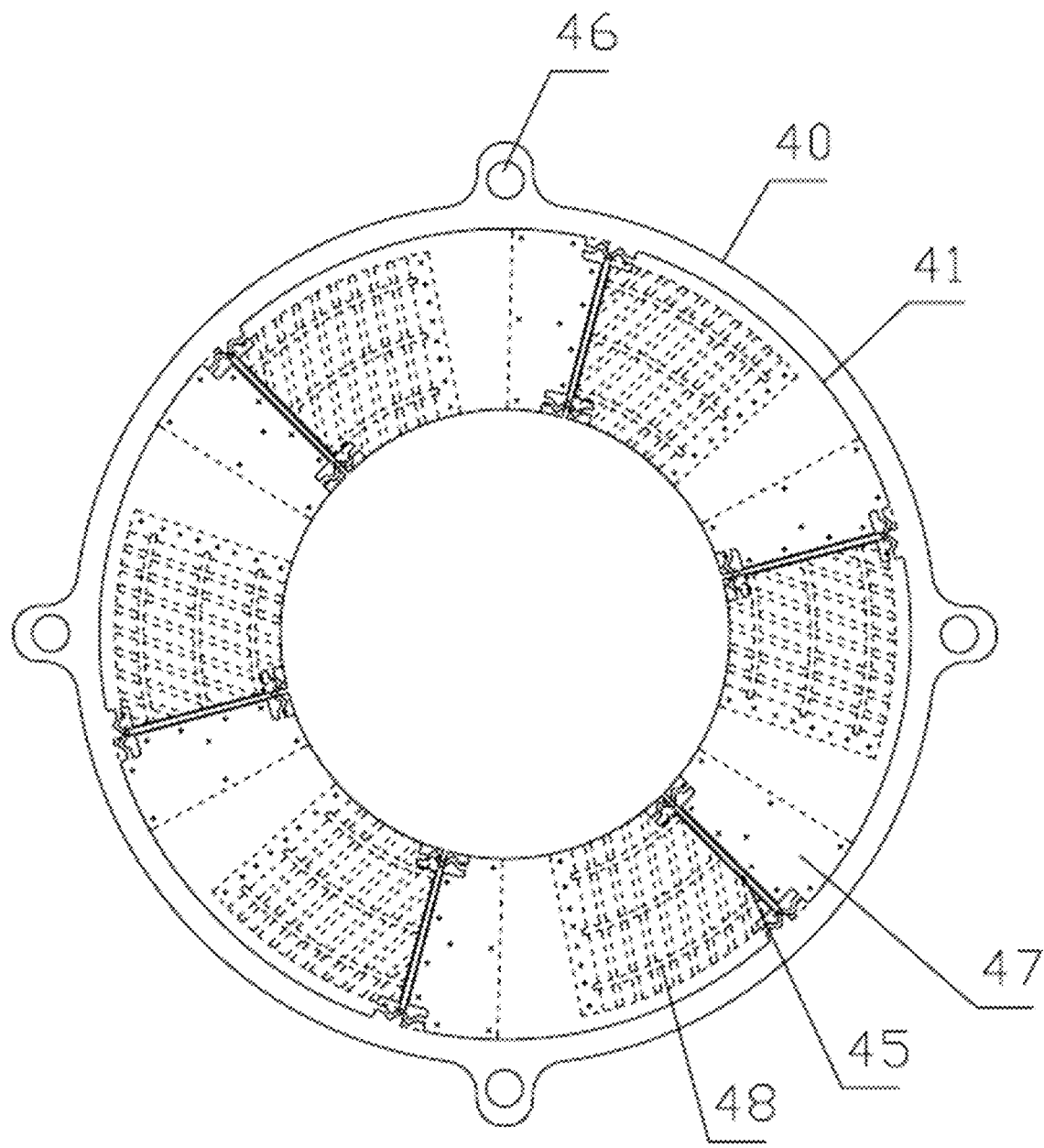
FIG. 9 is a schematic structural diagram of a thrust air bearing of the present disclosure.
Figure 10:
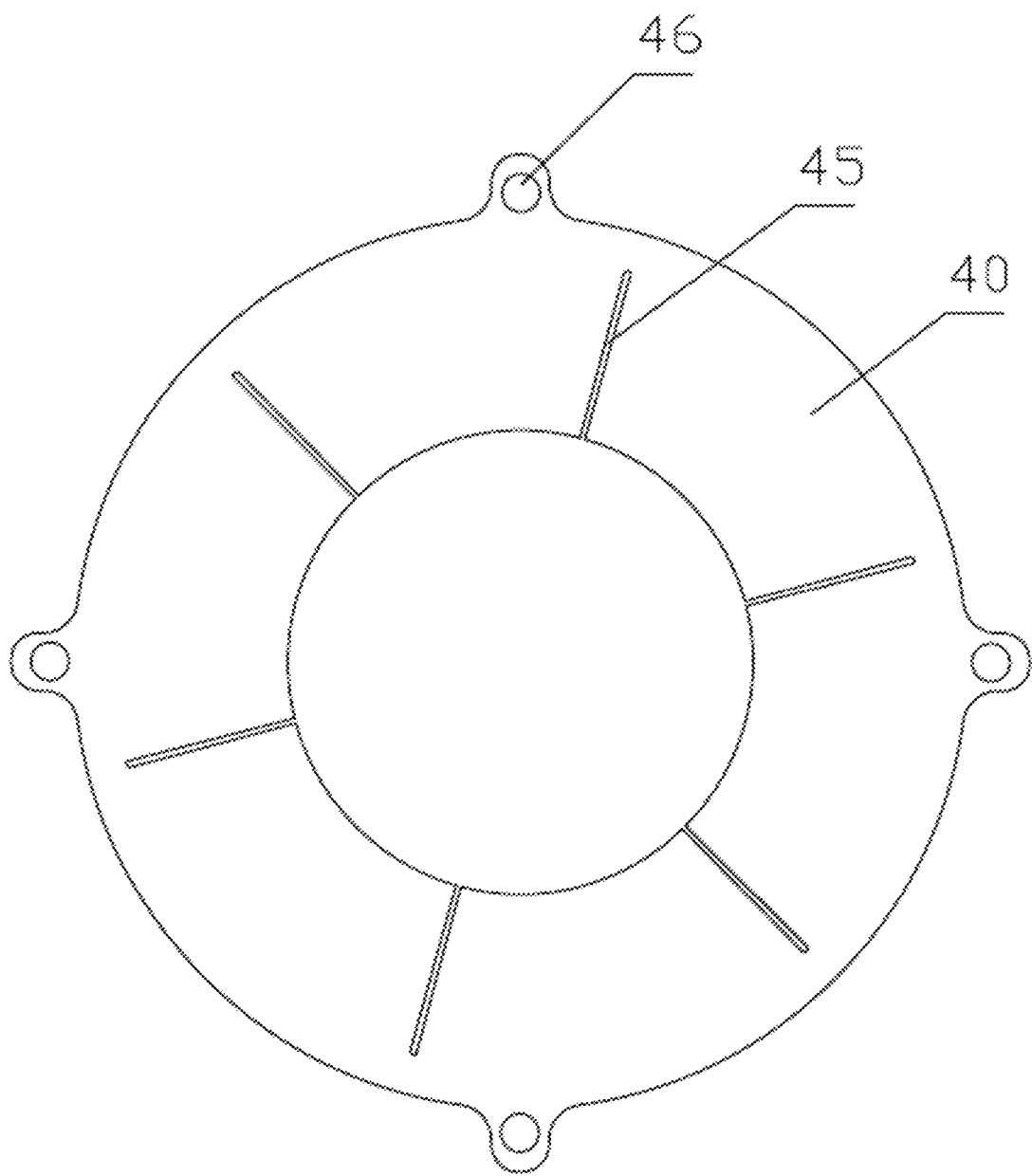
FIG. 10 is a schematic structural diagram of a bottom plate of a thrust air bearing of the present disclosure.
Figure 11:
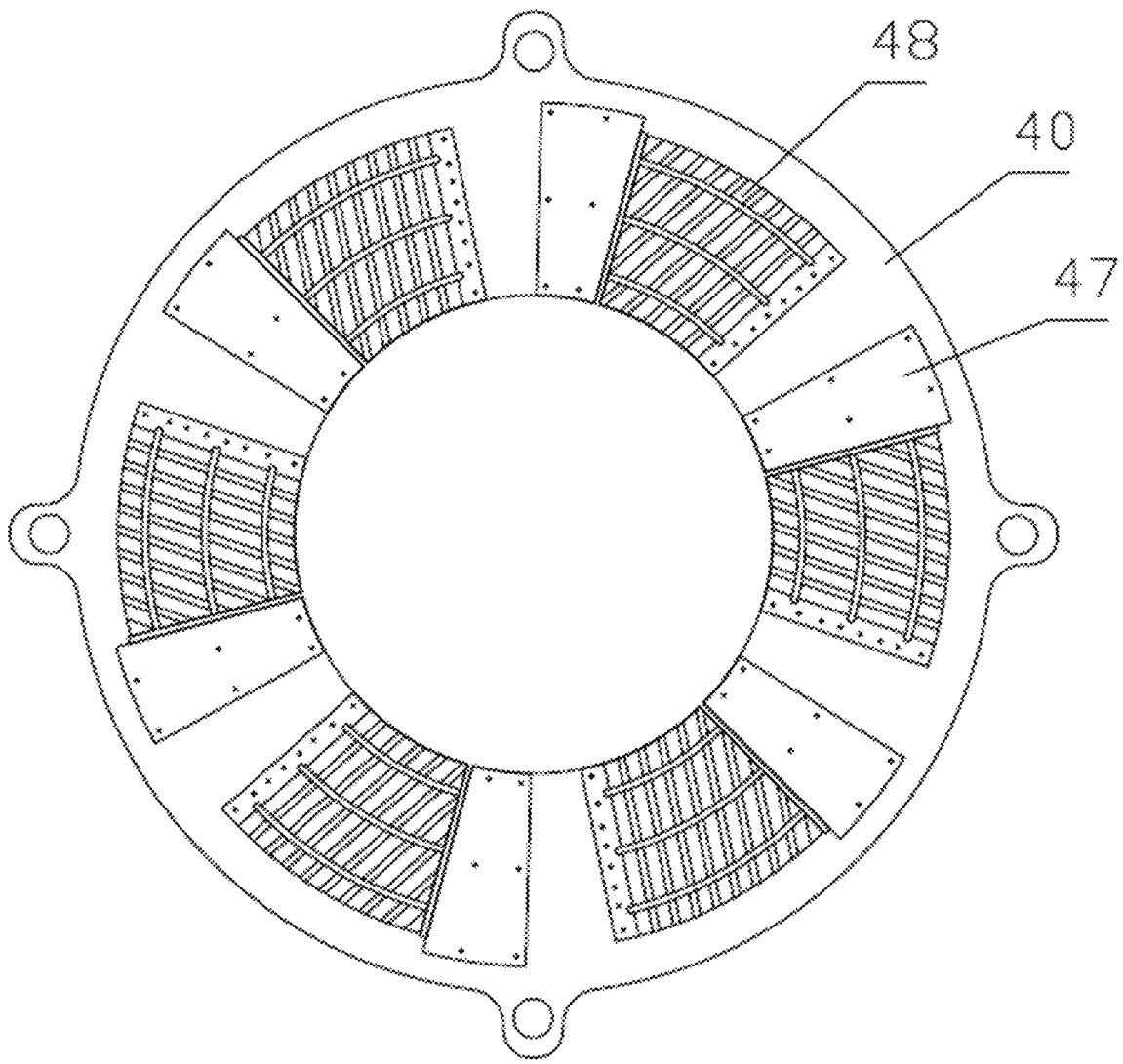
FIG. 11 is a schematic structural diagram of a middle supporting member of the present disclosure being mounted on a bottom plate.
Figure 12:
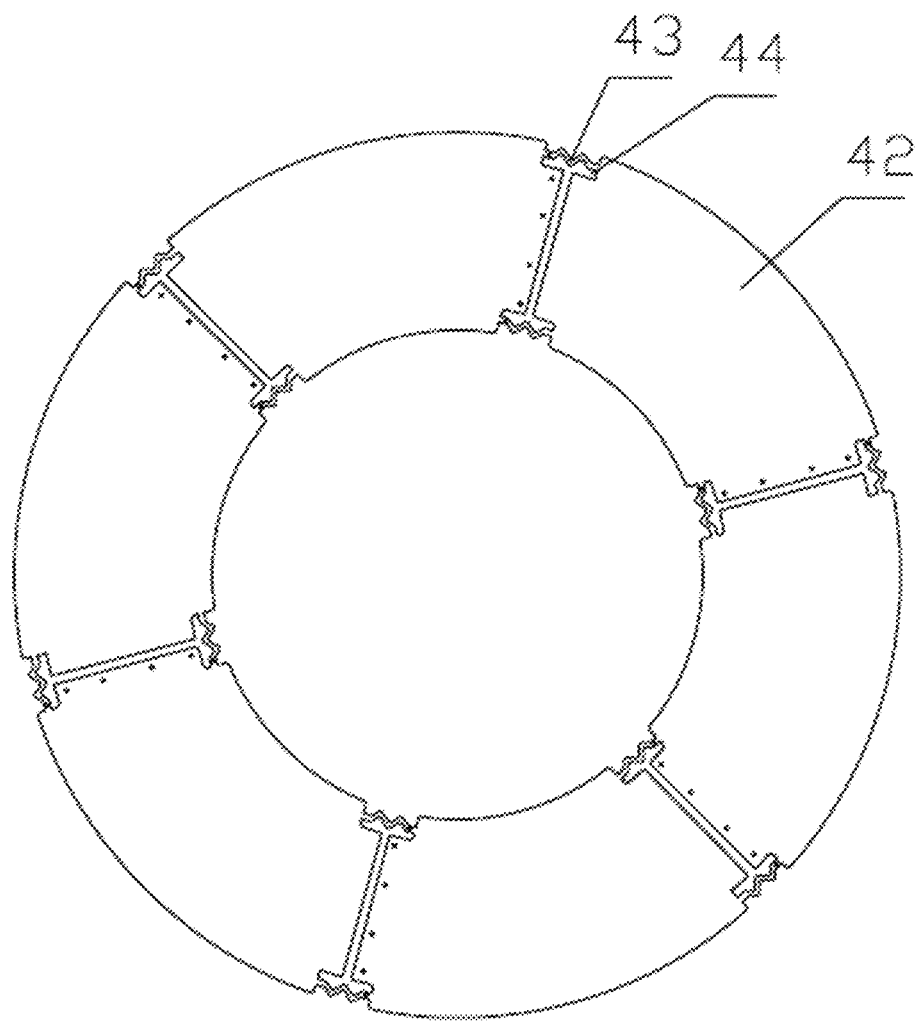
FIG. 12 is a schematic structural diagram of a top-layer foil of a thrust air bearing of the present disclosure.

As shown in FIG. 1 to FIG. 12, a high-speed centrifugal compressor includes a shell 1, a stator 2, and a main shaft 3. A primary bearing pedestal 4 and a secondary bearing pedestal 5 which are used for supporting the main shaft 3 are respectively mounted on inner sides of two ends of the shell 1. A primary diffuser 6 and a secondary diffuser 7 are respectively mounted on outer sides of the two ends of the shell 1. Two ends of the main shaft 3 penetrate through the primary diffuser 6 and the secondary diffuser 7 and are respectively provided with a primary worm wheel 8 and a secondary worm wheel 9. A primary volute 10 and a secondary volute 11 are mounted outside the primary worm wheel 8 and the secondary worm wheel 9. The primary volute 10 and the secondary volute 11 are connected through a connection pipe 100. A thrust collar 35 sleeves the main shaft 3 between the primary diffuser 6 and the primary bearing pedestal 4. One thrust air bearing 36 is arranged on each of two sides of the thrust collar 35. A radial air bearing 37 is arranged between each of the primary bearing pedestal 4 and the secondary bearing pedestal 5 and the main shaft 3; a sealing end cover 38 is arranged between the primary worm wheel 8 and the primary diffuser 6. Several annular slots 39 are arranged between the sealing end cover 38 and the primary worm wheel 8. Several annular slots 39 are arranged between the secondary diffuser 7 and the main shaft 3. A backflow air cooling system is arranged in the shell 1.

When the main shaft 3 drives the primary worm wheel 8 and the secondary worm wheel 9 to rotate at a high speed, high-pressure cavities are formed in the primary volute 10 and the secondary volute 11. Air leaks from the high-pressure cavities to a low-pressure cavity under the action of a pressure. When the air passes through the annular slots 39, air seals will be formed in the annular slots 39 to prevent the air from continuing to leak to the low-pressure cavity subsequently. The several air seals formed in the several annular slots 39 can greatly enhance a sealing effect between the high-pressure cavities and the low-pressure cavity and improve the compression efficiency of the high-pressure cavities.

The backflow air cooling system includes the following; The primary diffuser 6 includes a diffuser body 12. An air inlet hole 13 communicated with an inner cavity of the primary volute 10 is formed in the diffuser body 12. A worm wheel hole 14 is formed in a center of the diffuser body 12. One side of the diffuser body 12 is provided with a cooling air backflow cavity 15. A slot bottom of the cooling air backflow cavity 15 is provided with several air guide slots 16. The air guide slots 16 are communicated with the worm wheel hole 14. A first annular air guide slot 17 is arranged on the diffuser body 12 on the other side of a periphery of the cooling air backflow cavity 15. The cooling air backflow cavity 15 is communicated with the first annular air guide slot 17 through several air guide holes 18. The first air guide holes 18 are communicated with the air guide slots 16. The other side of the diffuser body 12 is provided with several first bosses 19 corresponding to a thrust bearing. A first air guide channel 20 is formed between adjacent first bosses 19. The first air guide channels 20 are communicated with the worm wheel hole 14. The primary bearing pedestal 4 includes a bearing pedestal body 21. A main shaft hole 22 is formed in a center of the bearing pedestal body 21. One side of the bearing pedestal body 21 is provided with a thrust bearing mounting slot 23. A second annular air guide slot 24 communicated with the air inlet hole 13 is arranged on the bearing pedestal body 21 at a periphery of the thrust bearing mounting slot 23. The thrust bearing mounting slot 23 is communicated with the second annular air guide slot 24 through several second air guide holes 25. A slot bottom of the thrust bearing mounting slot 23 is provided with several second bosses 26 corresponding to the thrust bearing. Second air guide channels 27 that are communicated are formed between adjacent second bosses 26. The second air guide channels 27 are communicated with a main shaft hole 22. The bearing pedestal body 21 between the thrust bearing mounting slot 23 and the second annular air guide slot 24 is provided with several via holes 28 communicated with the first annular air guide slot 17. Air in the inner cavity of the primary volute 10 enters the second annular air guide slot 24 from the air inlet hole 13 and enters the thrust bearing mounting slot 23 via the second air guide holes 25. After cooling one of the thrust bearings, one part of the air in the thrust bearing mounting slot 23 enters the main shaft hole 22 via the second air guide channels 27 and is discharged to a gap between the stator 2 and the main shaft 3. After cooling the other thrust bearing, the other part of the air enters the worm wheel hole 14 via the first air guide channels 20, flows back to the cooling air backflow cavity 15, then enters the first air guide holes 18 via the air guide slots 16, enters the first annular air guide slot 17 from the first air guide holes 18, is discharged from the first annular air guide slot 17 to the gap between the stator 2 and the main shaft 3 through the via holes 28, enters a cavity between the secondary bearing pedestal 5 and the secondary diffuser 7 through the main shaft hole of the secondary bearing pedestal 5 and the radial air bearing, and is discharged to the outside. A bottom of the secondary diffuser 7 is provided with an exhaust channel 29. A bottom of the shell 1 is provided with an exhaust hole 30 communicated with the exhaust channel 29. The air between the secondary bearing pedestal 5 and the secondary diffuser 7 is discharged to the outside through the exhaust channel 29 and the exhaust hole 30.

Several air guide vanes 31 are circumferentially arranged on the diffuser body 12 on the same side of the periphery of the cooling air backflow cavity 15. The air guide vanes 31 cooperate with the primary worm wheel 8, which can improve the air compression efficiency.

Several air outlet holes 32 are arranged between the first annular air guide slot 17 and an outer end face of the diffuser body 12. One part of the enter entering the first annular guide slots 17 is discharged into the centrifugal compressor to cool the inside of the centrifugal compressor. The other part of the air is directly discharged from the air outlet holes 32 into a primary compression cavity for continuous transportation to a secondary compression cavity.

A radial air bearing mounting slot 33 is arranged on the bearing pedestal body 21. On the one hand, the radial air bearing mounting slot 33 is used for mounting the radial air bearing. On the other hand, part of the air will also enter the radial air bearing mounting slot 33 from the main shaft hole 22 and be backwards discharged into the gap between the stator 2 and the main shaft 3. The air in the main shaft hole 22 can play a cooling role for the radial air bearing.

Stopper slots 34 used for mounting the radial air bearing are arranged on the bearing pedestal body 21 on two sides of the radial air bearing mounting slot 33. Stoppers are mounted in the stopper slots 34 through screws to fix the radial air bearing.

The several annular slots 39 between the sealing end cover 38 and the primary worm wheel 8 are arranged on an inner surface of the sealing end cover 38 or an outer surface of the primary worm wheel 8. The several annular slots 39 between the secondary diffuser 7 and the main shaft 3 are arranged on an inner surface of the secondary diffuser 7 or an outer surface of the main shaft 3. In both cases, air sealing structures can be formed.

The thrust air bearing 36 includes a bottom plate 40, a middle supporting member, and a top-layer foil 41. The bottom plate 40 is annular. The bottom plate 40 is circumferentially provided with several cooling grooves 45. Several fixed mounting holes 46 are formed in an outer edge of the bottom plate 40. The middle supporting member includes several supporting foils 47 and elastic foils 48. The supporting foils 47 and the elastic foils 48 are fixed on the bottom plate 40 in a spot welding manner. The supporting foil 47 and the elastic foil 48 form one group to support the top-layer foil 41. The top-layer foil 41 includes several single foils 42. The several single foils 42 are annularly arranged. Two adjacent single foils 42 are flexibly connected to form an integral top-layer foil structure.

The two adjacent single foils 42 are flexibly connected through a tie 43. The tie 43 is wavy. The tie 43 and the two adjacent single foils 42 are integrally formed. The wavy tie 43 ensures the integrality of the top-layer foil 41, and enables the top-layer foil 41 to have a certain stretching quantity and deformation, without affecting the rise or fall of the free end of the single foil 42 with the waveform, thus ensuring the stability of formation of the air film. Even if the top-layer foil 41 partially deforms, the entire top-layer foil 41 still works under the bending deformation caused by the stress.

The two adjacent single foils 42 are connected through two ties 43. The two ties 43 are respectively arranged at an annular inner edge and outer edge of the two adjacent single foils 42. Notches 44 are respectively formed in joints of the single foils 42 and the ties 43. The notches of the two adjacent single foils 42 are abutted to form a space for accommodating the ties. It can ensure that the ties 43 in the space have a certain length and thus have a space for stretching and deformation, and the connection strength is enhanced.

The above-mentioned specific implementations are not intended to limit the protection scope of the present disclosure. For those skilled in the art, any alternative improvements or transformations made to the implementations of the present disclosure fall within the protection scope of the present disclosure.

The parts that are not described in detail in the present disclosure are the well-known technologies for those skilled in the art.

What is claimed is:

1. A high-speed centrifugal compressor, comprising a shell, a stator, and a main shaft, wherein a primary bearing pedestal and a secondary bearing pedestal which are used for supporting the main shaft are respectively mounted on inner sides of two ends of the shell; a primary diffuser and a secondary diffuser are respectively mounted on outer sides of the two ends of the shell; two ends of the main shaft penetrate through the primary diffuser and the secondary diffuser and are respectively provided with a primary worm wheel and a secondary worm wheel; a primary volute and a secondary volute are mounted outside the primary worm wheel and the secondary worm wheel; the primary volute and the secondary volute are connected through a connection pipe; a thrust collar sleeves the main shaft between the primary diffuser and the primary bearing pedestal; two thrust air bearings are respectively arranged on two sides of the thrust collar; a first radial air bearing is arranged between the primary bearing pedestal and the main shaft and a second radial air bearing is arranged between the secondary bearing pedestal and the main shaft; a sealing end cover is arranged between the primary worm wheel and the primary diffuser; several annular slots are arranged between the sealing end cover and the primary worm wheel; several annular slots are arranged between the secondary diffuser and the main shaft; and a backflow air cooling system is arranged in the shell;

wherein each thrust air bearing comprises a bottom plate, a middle supporting member, and a top-layer foil; the top-layer foil comprises a set of several single foils; the set of several single foils are annularly arranged; and each two adjacent single foils of the set of several single foils are flexibly connected with each other through a tie to form an integral top-layer foil structure; the tie is wavy; and the tie and the two adjacent single foils are integrally formed.

2. The high-speed centrifugal compressor according to claim 1, wherein the backflow air cooling system comprises the following:

the primary diffuser comprises a diffuser body; an air inlet hole communicated with an inner cavity of the primary volute is formed in the diffuser body; a worm wheel hole is formed in a center of the diffuser body; one side of the diffuser body is provided with a cooling air backflow cavity; a slot bottom of the cooling air backflow cavity is provided with several air guide slots; the air guide slots are communicated with the worm wheel hole; a first annular air guide slot is arranged on the diffuser body on the other side of a periphery of the cooling air backflow cavity; the cooling air backflow cavity is communicated with the first annular air guide slot through several first air guide holes; the first air guide holes are communicated with the air guide slots; another side of the diffuser body is provided with several first bosses corresponding to a first thrust air bearing of the two thrust air bearings thrust bearing; a first air guide channel is formed between each two adjacent first bosses of the several first bosses; the first air guide channels are communicated with the worm wheel hole;

the primary bearing pedestal comprises a bearing pedestal body; a main shaft hole is formed in a center of the bearing pedestal body; one side of the bearing pedestal body is provided with a thrust air bearing mounting slot; a second annular air guide slot communicated with the air inlet hole is arranged on the bearing pedestal body at a periphery of the thrust air bearing mounting slot; the thrust air bearing mounting slot is communicated with the second annular air guide slot through several second air guide holes; a slot bottom of the thrust air bearing mounting slot is provided with several second bosses corresponding to a second thrust air bearing of the two thrust air bearings; each of second air guide channels is formed between each two adjacent second bosses of the several second bosses; the second air guide channels are communicated with the main shaft hole; the bearing pedestal body between the thrust air bearing mounting slot and the second annular air guide slot is provided with several via holes communicated with the first annular air guide slot;

air in the inner cavity of the primary volute enters the second annular air guide slot from the air inlet hole and enters the thrust air bearing mounting slot via the second air guide holes; one part of the air in the thrust air bearing mounting slot enters the main shaft hole via the second air guide channels and is discharged from the first radial air bearing to a gap between the stator and the main shaft; and another part of the air enters the worm wheel hole via the first air guide channels, flows back to the cooling air backflow cavity, then enters the first air guide holes via the air guide slots, enters the first annular air guide slot from the first air guide holes, is discharged from the first annular air guide slot to the gap between the stator and the main shaft through the via holes, enters a cavity between the secondary bearing pedestal and the secondary diffuser through the main shaft hole of the secondary bearing pedestal and the second radial air bearing, is discharged outside, and is discharged out of the shell through holes in the shell.

3. The high-speed centrifugal compressor according to claim 2, wherein a bottom of the secondary diffuser is provided with an exhaust channel; a bottom of the shell is provided with an exhaust hole communicated with the exhaust channel; and the air between the secondary bearing pedestal and the secondary diffuser is discharged through the exhaust channel and the exhaust hole.

4. The high-speed centrifugal compressor according to claim 2, wherein several air guide vanes are circumferentially arranged on the diffuser body on the same side of the periphery of the cooling air backflow cavity.

5. The high-speed centrifugal compressor according to claim 2, wherein several air outlet holes are arranged between the first annular air guide slot and an outer end face of the diffuser body.

6. The high-speed centrifugal compressor according to claim 2, wherein a radial air bearing mounting slot is arranged on the bearing pedestal body; and stopper slots used for mounting the first radial air bearing are arranged on the bearing pedestal body on two sides of the radial air bearing mounting slot.

7. The high-speed centrifugal compressor according to claim 1, wherein the several annular slots between the sealing end cover and the primary worm wheel are arranged on an inner surface of the sealing end cover or an outer surface of the primary worm wheel; and the several annular slots between the secondary diffuser and the main shaft are arranged on an inner surface of the secondary diffuser or an outer surface of the main shaft.

8. The high-speed centrifugal compressor according to claim 1, wherein the two adjacent single foils of the set of several single foils are connected through two ties; the two ties are respectively arranged at an annular inner edge and outer edge of the two adjacent single foils of the set of several single foils; notches are respectively formed in joints of the set of several single foils and the ties; and the notches of the two adjacent single foils of the set of several single foils are abutted to form a space for accommodating the ties.

* * * * *